March 10, 1953 A. J. BARACKET 2,631,232

DELAY LINE

Filed Aug. 9, 1950

INVENTOR.
ALBERT J. BARACKET
BY Darby & Darby
Attorneys

Patented Mar. 10, 1953 2,631,232

UNITED STATES PATENT OFFICE 2,631,232

DELAY LINE

Albert J. Baracket, Bloomfield, N. J., assignor to Allen B. Du Mont Laboratories, Inc., Clifton, N. J., a corporation of Delaware Application August 9, 1950, Serial No. 178,511

3 Claims. (Cl. 250—27)

This invention relates to electric timing generators and particularly to the delay lines used in such generators.

Delay lines may be used in timing generators such as standard television synchronizing generators in order to obtain the correct time relationship between various pulses, and this use of delay lines normally takes the form of a circuit comprising a pulse generator and a delay line having a transmission time equal to or greater than the longest delay desired. Taps may be provided at various points along the line for obtaining pulses delayed by the desired time with respect to the input pulse. The end (or both ends if the pulse source is connected at an intermediate point) of the delay line has heretofore been terminated in its characteristic impedance in order to prevent a return pulse which would upset the timing of the circuits attached to the various taps. In this invention the delay line is not terminated in its characteristic impedance, and means are provided to make use of the return pulses, thereby doubling the effective length of the delay line without increasing its physical size.

Figure 1:
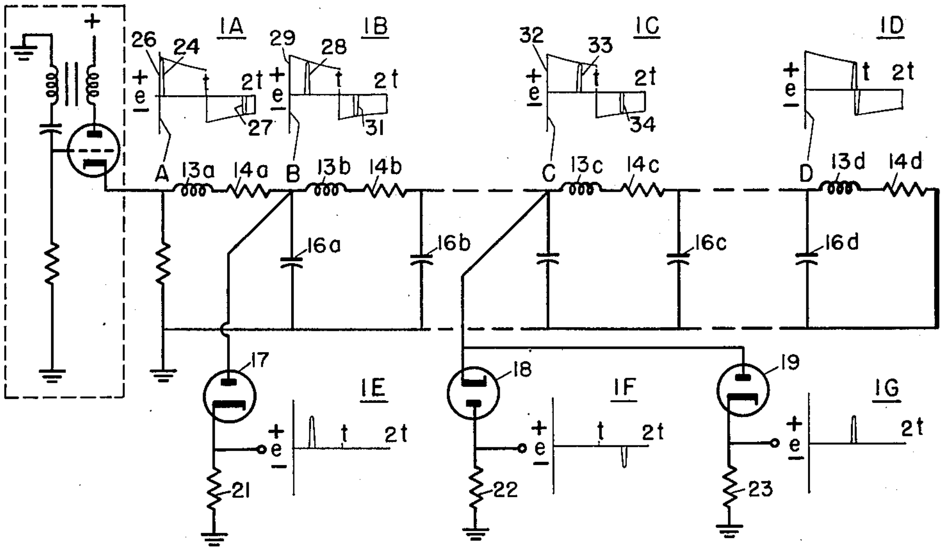
Figure 2:
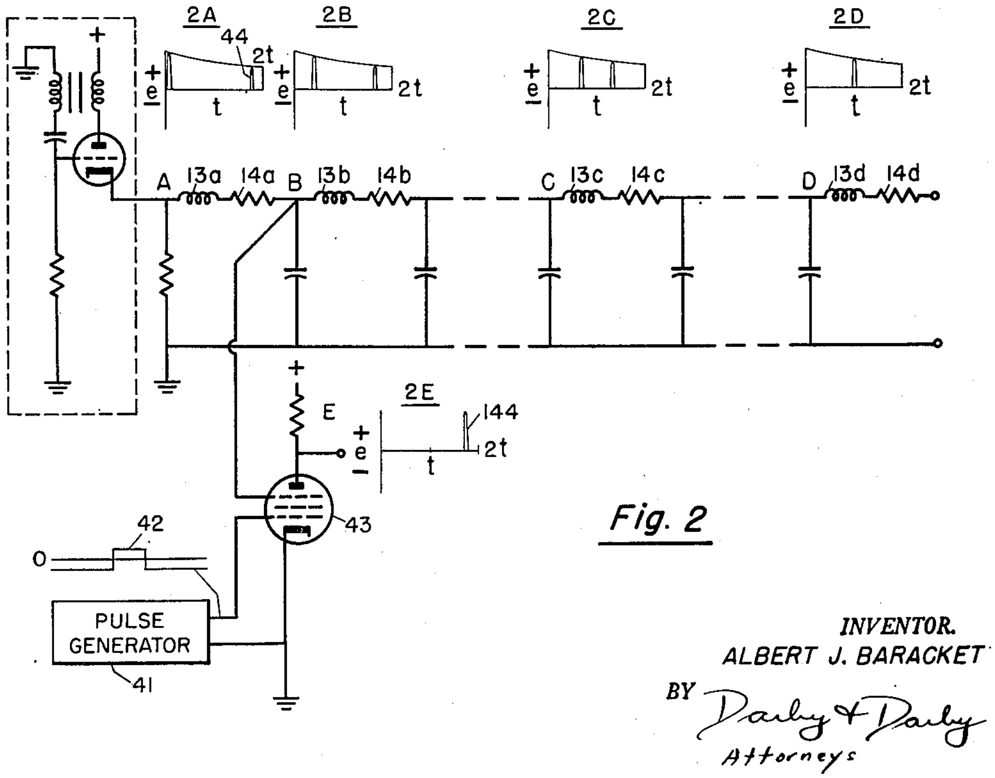

One object of this invention is to obtain an improved time generator. Another object is to obtain a more efficient delay line. Other objects will be apparent from the following specification and drawings in which:

Figure 1 is a schematic diagram of a delay line and associated apparatus showing one embodiment of the invention;

Figures 1*a*, 1*b*, 1*c*, 1*d*, 1*e*, 1*f*, and 1*g* illustrate at the respective identified points in the circuit of Figure 1, the initial and reflected waves with respect to time;

Figure 2 is a schematic diagram showing another embodiment of the invention; and Figures 2*a*, 2*b*, 2*c*, and 2*d* illustrate at the respective identified points in the circuit of Figure 2, the initial and reflected waves with respect to time.

In Figure 1 a pulse generator 11 which may be, for instance, a well known blocking oscillator, is connected to a delay line comprising a plurality of inductances 13*a*, *b*, *c*, and *d* with their losses indicated by resistance 14*a*, *b*, *c*, and *d* respectively and a plurality of capacitances 16*a*, *b*, *c*, and *d*. This is a conventional representation for a delay line which may be formed by a finite number of discreet elements with or without inductive coupling or by a coaxial or parallel transmission line. The distant end of the delay line is short circuited as shown by the heavy line. A number of diode rectifiers 17, 18, and 19, together with their respective load resistances 21, 22, and 23, are connected at desired points along the delay line.

The pulse generator 11 generates a series of pulses such as that indicated by the reference character 24, in the time diagram 26 of Figure 1*a*. This time diagram, like the others, shows, approximately, the time and amplitude relationship of the incident and reflected pulses at the indicated points along the delay line. In the time scale the distance from the origin to the point *t* represents the time required for a pulse to traverse the delay line in one direction, and 2*t* represents the total roundtrip time of the pulse. The reflected pulse at the input point *a* of the delay line is pulse 27 in Figure 1*a*, as can be seen it is delayed by 2*t* seconds from the pulse 24.

At another point *b* along the delay line the incident pulse 28 is shown in Figure 1*b* and the reflected pulse is pulse 31. Still further along the line at point *c*, Figure 1*c* shows the incident pulse 33 and the reflected pulse 34. At this point *c* in the delay line, the diode 18 is connected to pass negative pulses to the load 22, and, since the incident pulse 33 is a positive one, only the reflected pulse 34 will be transmitted through the diode 18. On the other hand, the diode 19 is connected so as to pass only positive pulses to the load 23 and therefore, only the incident pulse 33 will pass through the diode 19. Thus, it can be seen that selective circuits which will pass only positive pulses or only negative pulses may be connected at any point along the line at which a tap is provided, and either the incident or the reflected pulses may be chosen, thus giving a time delay up to twice the transmission time of the delay line. It is necessary that the loads 21, 22 and 23 on the diodes 17, 18 and 19 have sufficiently high impedance to prevent their loading down the line.

Figure 2 shows the same pulse generator 11 and delay line as Figure 1, except that the distant end of the delay line is open. In an open or unshorted delay line the reflected wave has the same polarity as the incident wave, and diode separation circuits cannot be used in the same manner as before. A second pulse generator 41 generates a series of pulses 42 which are applied to the amplifier tube 43. Tube 43 receives the timing pulses from a tap on the delay line. The amplifier tube 43 is normally biased considerably beyond cut-off so that the pulses from the delay line will not cause it to conduct until a positive portion of the pulse 42 brings the bias up to such a level that the pulses from the delay line occurring at the same time will cause conduction. The positive portion of the pulse 42 may be timed to include either the incident pulse along the delay line or the reflected pulse. In the case shown, the pulse 42 is timed to include the reflected pulse 44 which is amplified by the tube 43 and appears at the plate circuit as the pulse 144.

Although this invention has been illustrated by specific examples, it will be obvious to those skilled in the art that modifications may be made without departing from the scope of the invention.

What is claimed is:

1. An electrical timing circuit comprising a delay line terminated at one end by an impedance higher than the characteristic impedance of the delay line, a first pulse generator connected to the other end of said delay line to supply voltage pulses thereto, a second pulse generator, an electron discharge device having a plurality of input circuits, one of said input circuits being coupled to a point on said delay line, another of said input circuits being connected to the output of said second generator as a source of bias voltage, said bias voltage normally maintaining said electron discharge device in a nonconducting condition except when the positive portions of said electric wave occur at the same time said traveling pulse is impressed on said first named input circuit.

2. An electrical timing circuit comprising a delay line; an electric wave impulse generator connected to said delay line at an end thereof to cause an electric impulse wave to travel to the other end of said line, said other end being terminated by an impedance differing from the characteristic impedance of said line to cause a reflected impulse wave to travel back along said line; a plurality of electron discharge devices coupled to said delay line at points intermediate the ends thereof; a plurality of load impedances, each of said load impedances being connected to a corresponding one of said discharge devices in series therewith, said discharge devices being unidirectional and being rendered conductive by the wave impulses of only one polarity on said delay line at the points of coupling.

3. An electrical timing circuit comprising a delay line; an electric wave impulse generator connected to said delay line at an end thereof to cause an electric impulse wave to travel to the other end of said line, said other end being terminated by an impedance less than the characteristic impedance of said line to cause a reflected impulse wave to travel back along said line; a plurality of diodes coupled to said delay line at points intermediate the ends thereof; a plurality of load impedances, each of said load impedances being connected to a corresponding one of said diodes in series therewith, said diodes being rendered conductive by the wave impulses of only one polarity on said delay line at the points of coupling.

ALBERT J. BARACKET.

REFERENCES CITED

The following references are of record in the file of this patent:

UNITED STATES PATENTS

| Number | Name | Date |
|---|---|---|
| 2,227,906 | Kellogg | Jan. 7, 1941 |
| 2,266,154 | Blumlein | Dec. 16, 1941 |
| 2,414,541 | Madsen | Jan. 21, 1947 |